Oct. 19, 1948.  L. A. KILGORE ET AL  2,451,958

CONTROL SYSTEM FOR SYNCHRONOUS MACHINES

Filed Jan. 13, 1945

WITNESSES:
Leon M. Garman

INVENTORS
Lee A. Kilgore and
Simon L. Lindbeck.
BY
Paul E. Friedemann
ATTORNEY

Patented Oct. 19, 1948

2,451,958

UNITED STATES PATENT OFFICE 2,451,958

CONTROL SYSTEM FOR SYNCHRONOUS MACHINES

Lee A. Kilgore, Forest Hills, and Simon L. Lindbeck, Wilkinsburg, Pa., assignors to Westinghouse Electric Corporation, East Pittsburgh, Pa., a corporation of Pennsylvania Application January 13, 1945, Serial No. 572,608

7 Claims. (Cl. 318—180)

Our invention relates to electric systems of control and more particularly to systems for controlling the field excitation of synchronous motors.

Broadly, it is known to control the field excitation of synchronous motors as a function of the motor armature load current but motors of the synchronous type are in modern practice often called upon to drive rather heavy loads with respect to the rated capacity of the motor and in addition, such loads have the characteristic of usually rising rather frequently to a considerable overload for short periods of time. For such applications the existing systems of control are not adequate.

Synchronous motors driving motor generator sets for hoists, rolling mills, and other loads having high peak torques but low average torques, are at present normally selected over size for their rating to thus make certain that the high pull-out torque is obtained. Such machines with our systems of control for automatically controlling the field excitation can be selected to have a size more nearly corresponding to the average load requirements. That is, the motor selected for the load can more nearly approach the size necessary to handle the root-mean-square of the load cycle, and the high short-time torque obtained by an automatic increase of the field current. Field forcing by means of a relay and switches responsive to line current, the procedure now know in the art, is not satisfactory and results in excessive field heating particularly when the high torque peaks occur frequently.

One broad object of our invention is to provide a field control for a synchronous motor to automatically obtain high pull-out torque for a motor having a low inherent pull-out torque.

Another object of our invention is the provision of simple and inexpensive means for obtaining not only high pull-out torque but also to provide power factor control.

Another object of our invention is the provision of high synchronous motor pull-out torque with reference to the motor size, increased motor efficiency due to a reduction of the root-mean-square field current value, and maintenance of a selected power factor load characteristic.

The objects hereinbefore stated are merely illustrative and many other objects and advantages will become apparent from a study of the following specification and the accompanying drawing, in which.

Figure 1:
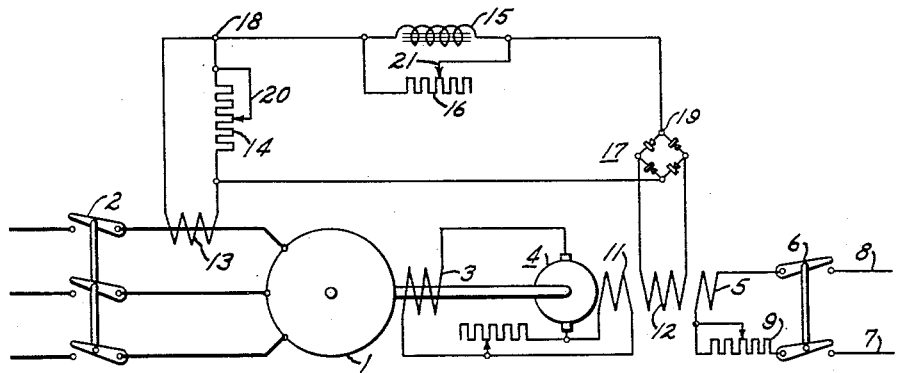
Figure 1 is a diagrammatic showing of one embodiment of our invention.

In Fig. 1, the synchronous motor 1 is shown for connection to the supply buses through switching means 2. The field winding 3 is supplied with excitation current from exciter 4. The important feature of our invention is embodied in the manner and the means for controlling the voltage of the exciter 4. This exciter is provided with a base or pattern field 5, disposed to be connected through suitable switching means 6 to the buses 7 and 8, representing a source of direct current of constant voltage. The base excitation of the exciter may be adjusted by the rheostat 9. The field current selected for field winding 5 determines point A, the intersection of the armature current-field ampere curve X with the no-load curve of the motor. By suitable adjustment of rheostat 9 this point may be altered at will. The slope of surve X can, however, not be determined by field 5, other than that this curve, corresponding to X, would remain normal to the field current axis if the exciter were provided with no other field than field 5.

The exciter 4 is, however, provided with two additional fields 11 and 12, respectively. Field 12, according to our contribution to the art, is energized automatically as a special and continuous function of the motor load current. Our special and continuous function is obtained by the elements constituting the control for the excitation current for fields 11 and 12, but primarily field 12.

The control for field 12 includes the current transformer 13, resistor 14, saturable reactor 15, adjustable resistor 16, and rectifier 17. Resistor 14 is shown as adjustable but usually the adjustment for this resistor is made when the resistor is installed. The adjustment determines the ratio of current transformation, that is, the proportion of the current from the current transformer being supplied to the rectifier.

The saturable reactor is a conventional reactor for a alternating circuit having no special provision for adjusting the point of saturation by means of a direct current altering the flux distribution in the magnetic circuit. A reactor of this type for all currents below a given value blocks substantially all output current. As soon as the current rises above such critical value the output current will follow the load current supplied by the current transformer 13.

Assuming, merely for the purpose of facilitating the description of our invention, that the saturable reactor 15 and adjustable resistor are not in the circuit but that junction 18 of the current transformer is connected directly to junction 19 of rectifier 17. The slope of curve X may then be determined by adjusting the field strength of the boost field 12. This change in slope may be effected by adjustment of the lead 20 on resistor 14. Furthermore, since the ratio of transformation of the current transformer is fixed curve X will be a straight line as curve X'. If the excitation of the base field 5 is selected so that curve X' intersects V₀ at A', the point of unity power factor for no load and then the slope of curve X', by adjustment of lead 20 is selected to also produce unity power factor at full load, then it will be apparent from a mere inspection of Fig. 2 to determine the intersection of curve X' with the V curves that the synchronous motor will pull out of synchronism for all loads falling above 1¾ of full load.

Since the main requirement is to prevent the motor from falling out of synchronism, a point, such as point A, has to be selected by the excitation control of field 5, and the slope has to be selected to at least produce unity power factor at two-and-half or possibly three times full load. The broken line curve X'' would indicate such operation. For this particular adjustment, it is apparent that the synchronous motor is at all loads, except the relatively high overload mentioned, overexcited. The field winding will thus heat up. Furthermore, the power factor will vary over a considerable range with changes of load.

To obviate these disadvantages and such erroneous control when a current transformer only is used, we discovered that the use of a saturable reactor, as 15, disposed in the supply leads from the current transformer to the rectifier 17 will for all loads from no-load to full load make the voltage of exciter 4 depend largely on field 5 only.

The curve X may thus be made, by suitable selection of a reactor, to follow an almost vertical straight line to point B on the full-load curve V₁. As the load current rises, the boost field 12 is automatically and continuously caused to rise with the armature current and thus not only produces a high pull-out torque but controls the excitation of the synchronous motor to obtain a given power factor. The power factor may be selected at will.

This property of our control of maintaining the excitation of the synchronous motor constant, say from point A to point B, and then to increase the excitation when the load exceeds full-load is of considerable value because the transient torque limit is a function of the initial excitation. An increase in the base value of excitation will thus permit larger sudden loads to be carried by the synchronous motor.

Our use of a saturating reactor in the compounding circuit thus allows alteration of the armature current-field characteristic. With our control, it is possible to adjust the characteristic to maintain constant field current for all loads from no-load up to some other higher load, usually full load, and then to increase the excitation for all loads higher than the said other or higher load. Such a characteristic is very desirable when a high order of transient stability is essential to carry sudden heavy overloads.

It will be noted that we also use a series field 11 or the exciter 4. Series field 11, like the boost field 12, increases the compounding effect. This series field reduces the amount of power required of the rectifier, that is, the amount of boost field current in the field winding 12. The greater the amount of series field used, the smaller the amount of base field and boost field needed. The extent to which the series field may be used for compounding purposes depends somewhat on the characteristics of the exciter as well as the synchronous motor. The use of the series field is, however, not critical so long as its excitation effect is kept within limits.

Figure 2:
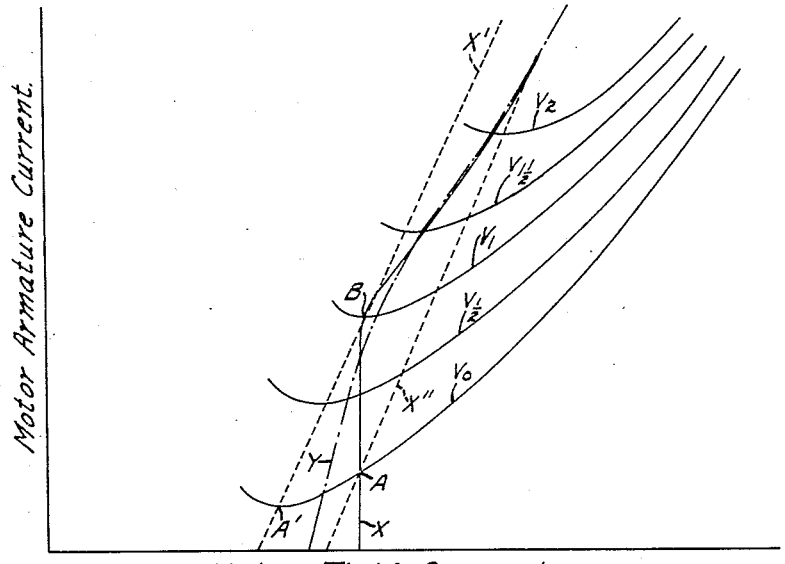
Fig. 2 shows a plurality of curves illustrating the control characteristics obtained with our systems of control.

When it is desirable to still further alter the curve X, we utilize an adjustable resistor 16 in shunt relation to the saturable reactor. The compounding characteristic may thus be altered to take any intermediate shape, that is a shape intermediate a straight line as X'' and curve X. A desirable curve, as Y, is shown in Fig. 2. When resistor 16 is an open circuit, the curve X is obtained. On the other hand, when the reactor 15 is completely shunted, as by positioning adjustable lead 21 on junction 18, then a curve, as X'', may be obtained.

While we have shown but one embodiment of our systems of control, others, particularly after having had the benefit of our teaching, may devise other similar systems of control, and in view of such possibility we do not wish to be limited to the particular showing but wish to be limited only by the scope of the claims hereto appended.

We claim as our invention:

1. In a system of control for a synchronous machine, in combination, an alternating-current circuit, a synchronous machine connected to said circuit, and excitation means for said machine including a current transformer connected to said circuit, a rectifier for supplying direct-current excitation to said excitation means, and circuit means connecting said rectifier and transformer including an alternating-current saturable reactor having a saturation point determined solely by the alternating current supplied thereto by said transformer whereby it is substantially effective to block all input to said rectifier for currents below a selected load on said circuit, and effective to pass current to said rectifier above said selected load.

2. In a system of control for a synchronous machine, in combination, an alternating-current circuit, a synchronous machine connected to said circuit, and excitation means for said machine including a current transformer connected to said circuit, a rectifier for supplying direct-current excitation to said excitation means, circuit means connecting said rectifier and transformer including an alternating-current saturable reactor having a saturation point determined solely by the alternating current supplied thereto by said transformer whereby it is substantially effective to block all input to said rectifier for currents below a selected load on said circuit, and effective to pass current to said rectifier above said selected load, and an adjustable impedance connected across the output terminals of said transformer for selecting the point at which a load on said circuit will be effective to saturate said reactor.

3. In a system of control for a synchronous machine, in combination, an alternating-current circuit, a synchronous machine connected to said circuit, and excitation means for said machine including a current transformer connected to said circuit, a rectifier for supplying direct-current excitation to said excitation means, circuit means connecting said rectifier and transformer including an alternating-current saturable reactor having a saturation point determined solely by the alternating current supplied thereto by said transformer whereby it is substantially effective to block all input to said rectifier for currents below a selected load on said circuit, and effective to pass current to said rectifier above said selected load, and an adjustable impedance connected in shunt to said reactor for controlling the current passed to the rectifier at load currents less than those effective to saturate the reactor.

4. In a system of control for a synchronous machine, in combination, an alternating-current circuit, a synchronous machine connected to said circuit, and excitation means for said machine including a current transformer connected to said circuit, a rectifier for supplying direct-current excitation to said excitation means, circuit means connecting said rectifier and transformer including an alternating-current saturable reactor having a saturation point determined solely by the alternating current supplied thereto by said transformer whereby it is substantially effective to block all input to said rectifier for currents below a selected load on said circuit, and effective to pass current to said rectifier above said selected load, an adjustable impedance connected in shunt to said reactor for controlling the current passed to the rectifier at load currents less than those effective to saturate the reactor, and an adjustable impedance connected across the output terminals of said transformer for selecting the point at which a load on said circuit will be effective to saturate said reactor.

5. In a system of control for a synchronous machine, in combination, an alternating-current circuit, a synchronous machine connected to said circuit, and excitation means for said machine including a current transformer connected to said circuit, a rectifier for supplying direct-current excitation to said excitation means, circuit means connecting said rectifier and transformer including an alternating-current saturable reactor having a saturation point determined solely by the alternating current supplied thereto by said transformer whereby it is substantially effective to block all input to said rectifier for currents below a selected load on said circuit, and effective to pass current to said rectifier above said selected load, and adjustable means for varying the output of said transformer to change the point at which a load on said circuit will be effective to saturate said reactor.

6. In a system of control for a synchronous machine, in combination, an alternating-current circuit, a synchronous machine connected to said circuit, and excitation means for said machine including a current transformer connected to said circuit, a rectifier for supplying direct-current excitation to said excitation means, circuit means connecting said rectifier and transformer including an alternating-current saturable reactor having a saturation point determined solely by the alternating current supplied thereto by said transformer whereby it is substantially effective to block all input to said rectifier for currents below a selected load on said circuit, and effective to pass current to said rectifier above said selected load, and an adjustable means for varying the strength of said excitation means in proportion to load currents less than those effective to saturate said reactor.

7. In a system of control for a synchronous machine, in combination, an alternating current circuit, a synchronous machine connected to said circuit, an exciter for supplying said machine with direct current excitation, means controlling the output of said exciter comprising a base field having a constant source of direct current energizing potential, a control field, and energizing means for said control field including a current transformer connected to said alternating current circuit, a rectifier for supplying direct current excitation to said control field, and a circuit connecting said rectifier and transformer comprising an alternating current saturable reactor having a saturation point determined solely by the alternating current supplied thereto by said transformer whereby it is substantially effective to block all input to said rectifier for currents below a selected load on said circuit, and effective to pass current to said rectifier above said selected load, and means for adjusting the strength of said base field.

LEE A. KILGORE.
SIMON L. LINDBECK.

REFERENCES CITED

The following references are of record in the file of this patent:

UNITED STATES PATENTS

| Number | Name | Date |
|---|---|---|
| Re. 30,317 | Suito | Mar. 30, 1937 |
| 513,425 | Scott | Jan. 23, 1894 |
| 1,943,524 | Godsey | Jan. 23, 1934 |
| 2,146,778 | Swanson | Feb. 14, 1939 |
| 2,215,312 | Alexanderson | Sept. 17, 1940 |
| 2,238,623 | Chambers | Apr. 15, 1941 |
| 2,328,996 | Park | Sept. 7, 1943 |
| 2,371,030 | Crary | Mar. 6, 1945 |

FOREIGN PATENTS

| Number | Country | Date |
|---|---|---|
| 493,918 | Great Britain | Oct. 17, 1938 |
| 525,578 | Germany | May 26, 1931 |
| 640,872 | Germany | Jan. 14, 1937 |